(No Model.)

W. C. MORELAND.
SELF LUBRICATING BEARING.

No. 567,489. Patented Sept. 8, 1896.

Witnesses
C. H. Raeder
H. A. James

Inventor
W. C. Moreland.
By James J. Sheehy
Attorney

UNITED STATES PATENT OFFICE.

WELDON C. MORELAND, OF MARYSVILLE, MONTANA.

SELF-LUBRICATING BEARING.

SPECIFICATION forming part of Letters Patent No. 567,489, dated September 8, 1896.

Application filed April 29, 1896. Serial No. 589,603. (No model.)

*To all whom it may concern:*

Be it known that I, WELDON C. MORELAND, a citizen of the United States, residing at Marysville, in the county of Lewis and Clarke and State of Montana, have invented certain new and useful Improvements in Self-Lubricating Bearings; and I do declare the following to be a full, clear, and exact description of the invention, such as will enable others skilled in the art to which it appertains to make and use the same.

My invention relates to improvements in that class of self-lubricating bearings which are designed and adapted to maintain a continuous circulation or passage of lubricant over the entire surface of a journal, so as to prolong the usefulness of said lubricant and keep the journal thoroughly lubricated and thereby reduce frictional wear of said journal and its bearing to a minimum.

The novelty and advantages of the invention will be fully understood from the following description and claims, when taken in conjunction with the annexed drawings, in which—

Figure 1:
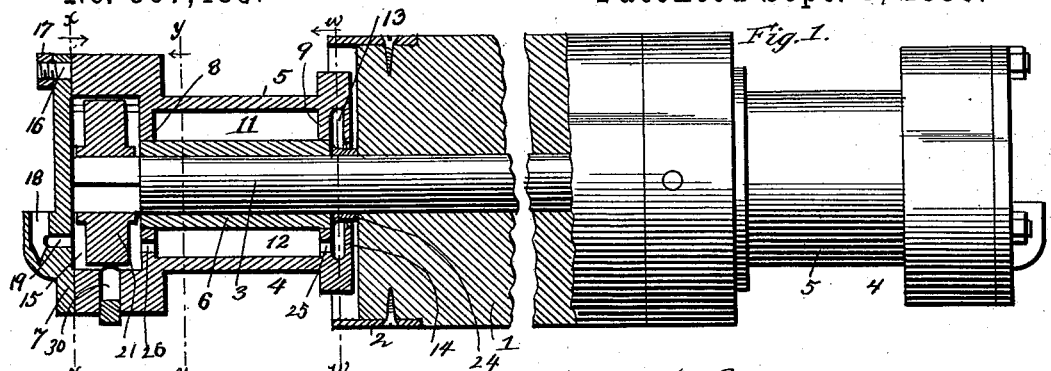
Figure 2:
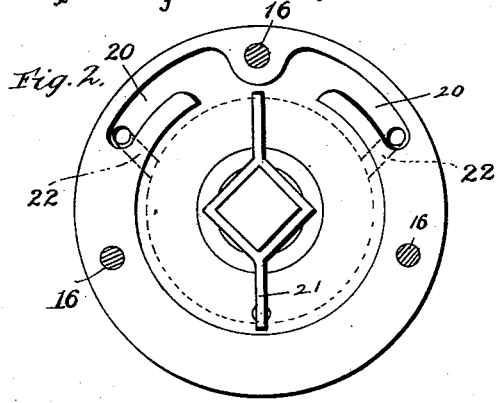
Figure 3:
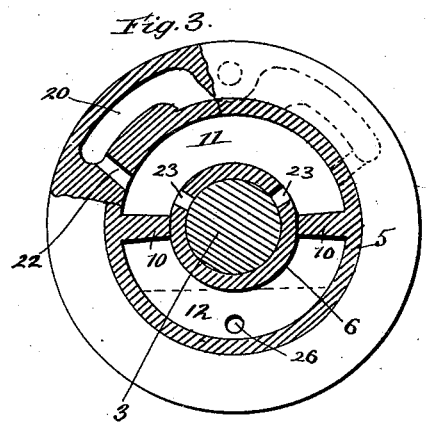
Figure 4:
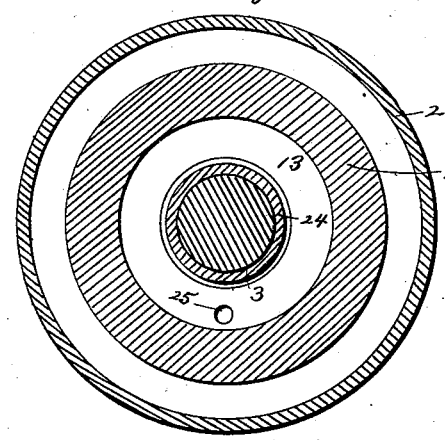
Figure 5:
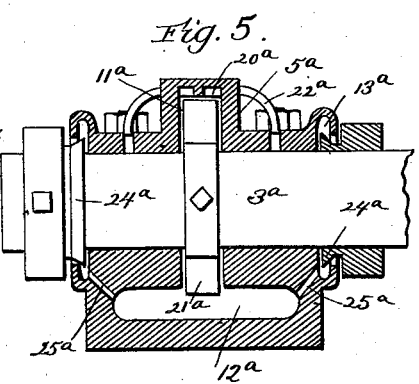

Figure 1 is a broken view, partly in section and partly in elevation, illustrating my improved lubricating-bearings as used in conjunction with the journals of a cable-roll such as employed in the hoisting-shafts of mines. Figs. 2, 3, and 4 are transverse sections taken in the planes indicated by the lines $xx$, $yy$, and $ww$, respectively, of Fig. 1; and Fig. 5 is a sectional view of a modification.

In the said drawings similar numerals designate corresponding parts in all of the views.

1 indicates a wooden cable-roll, such as employed in mine-shafts, which is provided with wrought-iron bands 2 at its ends, and is also provided with suitable journals 3; and 4 indicates my improved self-lubricating bearings. These self-lubricating bearings 4, which are designed to be mounted in or on suitable supports, (not illustrated,) are similar in construction, and respectively comprise the shell 5, the bushing 6, and the end plate 7. The shell 5 is preferably formed in one piece, as illustrated in Fig. 1, and it has the flanges or annular partition-walls 8 9, and the longitudinal diametrically-disposed partition-walls 10, (see Fig. 3,) which serve, in conjunction with the bushing 6, which they receive, to form the upper and lower chambers 11 and 12, the purpose of which will be presently described. The said shell 5 also has a chamber 13, between the annular wall or flange 9 and its inner end wall 14, and a chamber 15 at the outer side of the annular wall or flange 8, which chamber 15 is preferably enlarged diametrically, as illustrated, and is closed by the end plate 7, as illustrated. The end plate 7 may be connected to the end of shell 5 by bolts and nuts 16 17, or other suitable means, and it is provided with a filling-cup 18, which is connected with the chamber 15 of the bearing by an aperture or passage 19 formed in the end plate, as shown.

As better illustrated in Figs. 2 and 3 of the drawings, the shell 5 is provided above the chamber 15 with pockets 20, which are arranged in the same transverse plane with and communicate with said chamber 15 at their inner, upper, and contiguous ends, and are designed to receive the lubricant which is raised and thrown off by the wing or plurality of wings 21, arranged in the chamber 15, as shown in Figs. 1 and 2 of the drawings. The pockets 20 are pitched or inclined downwardly and outwardly from their upper contiguous ends which communicate with the upper portion of the chamber 15, as shown, so as to prevent the lubricant, after being lifted into the pockets by the wings 21, from passing back into the chamber 15, and also to accelerate the passage of such lubricant to the passages 22, which communicate with the lower ends of the pockets. The wing or wings 21 are mounted upon the square end of the journal or are otherwise secured to said journal, so as to turn therewith, and they are designed and adapted to lift the oil from the lower portion of chamber 15 and discharge it into the pockets 20. Two pockets 20 are provided in order to catch the oil thrown off by the wings 21 regardless of the direction in which the journal is rotated, and it will therefore be obvious that when the journal is to be rotated in but one direction one of the pockets 20 may be dispensed with. I prefer, however, to employ the two pockets 20 for obvious reasons. The pockets 20 are connected with the chamber 11 by the passages 22, (see Figs. 2 and 3,) and said chamber 11 is in turn connected with the interior of the bushing 6 and the journal 3 by the aperture or apertures 23, formed in the said bushing, as shown in Fig. 3. A collar 24, of suitable material, preferably steel, is provided at the inner end of the bushing and within the chamber 13, and said chamber 13 is connected by an aperture 25 in wall 9 with the chamber 12, which is in turn connected with the chamber 15 by an aperture 26, formed in the wall or flange 8.

Lubricant is introduced into the self-lubricating bearing through the cup 18 and aperture 19 of end plate 7, and passing through the aperture or passage 26 in wall 8, enters the chamber 12, and occupies said chamber and the chamber 15 to about the height illustrated by dotted lines in Fig. 3. The roll and the journal 6 being now rotated, the lubricant is taken up on the wings 21 from the lower portion of chamber 15, and is discharged into the pockets 20, or into one of the same. From the pockets 20 the lubricant passes through the passages 22 into the chamber 11, and from thence through apertures 23 in bushing to the interior of the bushing and into the journal 3. The rotation of the journal spreads the lubricant over the entire surface thereof, and it is gradually worked to the inner end of the bushing and upon the collar 24, from which it is thrown off by centrifugal action into the chamber 13. From this chamber 13 the lubricant passes through aperture 25 into the chamber 12, and entering the chamber 15 through aperture 26 is again taken up by the wings 21 and caused to take the course described through the bearing. This circulation of the lubricant is maintained so long as the journal rotates, and in consequence all parts of the journal are at all times thoroughly lubricated and frictional wear of the journal and its bearings are therefore reduced to a minimum.

I have found from experience that one charge of lubricant will serve efficiently for about two weeks with the roll running continuously day and night. At the end of this time the lubricant is drawn off through the normally closed aperture 30, which communicates with the chamber 15, and fresh charge of lubricant is introduced through the cup 18 and passage 19, after which said cup may be plugged or otherwise closed.

The roll 1 illustrated forms no part of my invention, and is here shown simply to illustrate one application of my invention; and I would have it understood that my improvements may be applied with equal advantage to shafts of various kinds, and may be embodied in pillow-blocks, shaft-hingers, and bearings of various kinds. I would also have it understood that I do not confine myself to the specific construction and arrangement of parts described, as in practice such changes or modifications may be made as fairly fall within the scope of my invention.

In Fig. 5 of the drawings I have illustrated a self-lubricating pillow-block bearing embodying my invention. In this construction chambers $13^a$ are provided at opposite ends of the shell $5^a$, and collars $24^a$ are fixed on the journal $3^a$ and arranged in said chambers $13^a$, said collars being designed by centrifugal action to throw off lubricant into said chambers. The shell $5^a$ is further provided with a lower chamber $12^a$, which is connected with the end chambers $13^a$ by passages $25^a$ and with an upper chamber $11^a$. This upper chamber $11^a$ communicates with inclined pockets $20^a$, similar to the pockets 20 in Figs. 1 and 4; and these pockets $20^a$ are connected with the journal by passages $22^a$, as shown. Lubricant may be introduced into the self-lubricating bearing illustrated in Fig. 5 at the ends of the shell $5^a$, and passing through the end chambers $13^a$ and the passages $25^a$, it enters the lower chamber $12^a$. From said chamber $12^a$ it is lifted by the wing or wings $21^a$ on the journal $3^a$ to one of the pockets $20^a$, from whence it passes by the passages $22^a$ to the journal to lubricate the same. The lubricant is spread over the journal by the rotation thereof and is marked onto the collar $24^a$, from whence it is thrown into the chambers $13^a$ by centrifugal action.

It will be observed from the foregoing that the operation of the bearing shown in Fig. 5 is similar to the operation of that shown in Figs. 1 and 4, and that the constructions of said bearings are the same in substance.

Having described my invention, what I claim is—

1. The combination of a journal and a self-lubricating bearing comprising a bushing receiving the journal, the end plate having the filling-cup 18 and the shell having the annular partition walls or flanges provided with apertures and also having the inner end chamber and serving in conjunction with the bushing to form upper and lower chambers and in conjunction with the end plate to form an outer end chamber and further having the inclined pocket 20 communicating at its upper end with the upper portion of said end chamber and a passage connecting the lower end of said pocket and the upper chamber, a collar arranged at the inner end of the bushing, and a wing arranged on the journal within the outer end chamber, substantially as specified.

2. The combination of a journal and the self-lubricating bearing receiving the journal and having a circular chamber, a passage connecting the lower portion of said chamber and the journal, the downwardly and outwardly inclined pockets arranged in the same transverse plane as the chamber and communicating at their upper ends with the upper portion of the chamber, a passage connecting the lower ends of said pockets and the journal, and a wing fixed on the journal so as to turn therewith and arranged in the circular chamber, substantially as specified.

3. The combination of a journal and the self-lubricating bearing receiving the journal and having the circular chamber, a passage connecting the lower portion of said chamber and the journal, the downwardly and outwardly inclined pockets arranged in the same transverse plane as the chamber and communicating at their upper contiguous ends with said chamber, passages connecting the lower ends of said pockets and the journals and wings fixed on the journal so as to turn therewith and arranged in the circular chamber, substantially as specified.

In testimony whereof I affix my signature in presence of two witnesses.

WELDON C. MORELAND.

Witnesses:
WILLIAM C. MOORE,
GEO. W. PADBURY.